United States Patent [19]

Ohtomo et al.

[11] Patent Number: 4,692,023

[45] Date of Patent: Sep. 8, 1987

[54] OPTICAL ADAPTER FOR A LIGHT-WAVE RANGEFINDER

[75] Inventors: Fumio Ohtomo; Nobuo Hori; Yoshio Horikawa; Kazuaki Kimura; Hiroo Sugai, all of Tokyo, Japan

[73] Assignee: Tokyo Kagaku Kikai Kabushiki Kaisha, Tokyo, Japan

[21] Appl. No.: 816,581

[22] Filed: Jan. 6, 1986

Related U.S. Application Data

[63] Continuation-in-part of Ser. No. 634,547, Jul. 26, 1984, abandoned.

[30] Foreign Application Priority Data

| Jul. 30, 1983 | [JP] | Japan | 58-138742 |
| Jan. 9, 1985 | [JP] | Japan | 60-1879 |
| Jan. 9, 1985 | [JP] | Japan | 60-1881 |
| Jan. 19, 1985 | [JP] | Japan | 60-1322 |

[51] Int. Cl.$^4$ .................. G01F 23/00; G01B 11/14
[52] U.S. Cl. ........................ 356/5; 356/375; 73/293
[58] Field of Search ............ 356/4, 5, 375; 73/293; 364/509; 250/227

[56] References Cited

U.S. PATENT DOCUMENTS

| 3,521,956 | 7/1970 | Froome et al. | 356/5 |
| 3,663,822 | 5/1972 | Uchida | 250/227 X |
| 4,287,427 | 9/1981 | Scifres | 73/293 X |
| 4,325,638 | 4/1982 | Takeda et al. | 356/375 |
| 4,413,904 | 11/1983 | Hamada et al. | 356/5 |
| 4,420,250 | 12/1983 | Kompa | 356/4 X |
| 4,451,146 | 5/1984 | Grage et al. | 356/5 |
| 4,498,764 | 2/1985 | Bölkow et al. | 356/5 |

FOREIGN PATENT DOCUMENTS

| 91665 | 10/1983 | European Pat. Off. | 356/5 |
| 0117574 | 9/1984 | European Pat. Off. | |
| 2305036 | 2/1975 | Fed. Rep. of Germany | |
| 2630789 | 1/1978 | Fed. Rep. of Germany | |
| 3111743 | 10/1982 | Fed. Rep. of Germany | |
| WO83/03135 | 9/1983 | PCT Int'l Appl. | |
| 1062967 | 3/1967 | United Kingdom | |
| 1193567 | 6/1970 | United Kingdom | |

Primary Examiner—L. T. Hix
Assistant Examiner—D. Rutledge
Attorney, Agent, or Firm—Browdy and Neimark

[57] ABSTRACT

An optical adapter for a light-wave rangefinder comprising a light emitting means for emitting a distance measuring light wave modulated by a predetermined modulation frequency, and a light receiving means for receiving a reflecting light wave reflecting from a target point to which the distance measuring light wave is directed, wherein a time delay between the distance measuring light wave and the reflecting light wave is utilized to determine the distance to the target point, the optical adapter comprising at least one photoconduction means for conducting distance measuring light wave and the reflecting light wave, and at least one single objective optical means for projecting the distance measuring light wave from the photoconduction means towards the target point, for condensing the reflecting light wave reflecting form the target point and for guiding the light wave to the photoconduction means.

28 Claims, 15 Drawing Figures

4,692,023

OPTICAL ADAPTER FOR A LIGHT-WAVE RANGEFINDER

RELATED APPLICATION

This is a continuation in-part-of application Ser. No. 634,547, filed on July 26, 1984, now abandoned.

FIELD OF THE INVENTION

The present invention relates to an optical adapter for a light-wave rangefinder. A light-wave rangefinder has been put to practical use principally in the surveying field, in which a distance measuring light wave modulated by a modulation frequency in the range from several tens of kilohertz to some ten megahertz is projected on a desired target point so as to accurately determine the distance to the target point from a phase difference due to a time delay between said distance measuring light wave and the light reflecting from the target point. And the invention furthermore relates to a liquid level height-measuring apparatus for measuring a height of a liquid level to be distance measured by using such a light-wave rangefinder. This liquid level height-measuring apparatus is, more specifically, used for measuring a height of a level of crude oil in a crude oil tank.

BACKGROUND OF THE INVENTION

Recently, use of the light-wave rangefinder has been studied even in measuring fields other than the surveying field in view of easiness of operation and high precision thereof. However, where the light-wave rangefinder is utilized in the aforementioned measuring fields other than the surveying field, there poses problems in that it is impossible to secure a place where a light-wave rangefinder is installed depending on measuring objects or measuring environment, and that the light-wave rangefinder is adversely affected such that the electronic circuit housed in the light-wave rangefinder undergoes noises.

On the other hand, where an attempt is made to measure the liquid level in a petroleum tank or the like by a lightwave rangefinder, if short-circuiting or spark should occur in the electronic circuit housed in the light-wave rangefinder, there involves a danger in that the flammable gases within the tank would be exploded. Therefore, there poses a problem in that the measuring environment is adversely affected by the light-wave rangefinder such that it is not possible to install a light-wave rangefinder within the tank for measurement.

Moreover, turning now to the surveying field, recently, a so-called "light-wave alidade" in which an alidade and a short-range type light-wave rangefinder are combined has been utilized for a plane-table survey to contribute to labor saving. In this case, however, the large body of the lightwave rangefinder is added to the alidade, and therefore, a problem still remains in manipulation as compared with usual alidades.

The present invention has been made in an attempt to solve all the problems noted above.

It is a first object of the present invention to provide a light-wave rangefinder which can be more widely used than the conventional ones for various measuring fields and objects in various measuring environments.

It is a second object of the present invention to provide a novel light-wave alidade which is smaller in size and easier to manipulate than a conventional light-wave alidade.

It is a third object of the invention to provide a liquid level measuring apparatus in which is utilized a lightwave rangefinder.

It is a fourth object of the invention to provide a liquid level measuring apparatus utilizing a light-wave rangefinder having a photoconduction or light-wave transmission pipe member which can eliminate the measuring error being caused by the vibration or the deformation of the pipe member or liquid containing tank.

SUMMARY OF THE INVENTION

To achieve these objects noted above, the present invention provides an optical adapter to be mounted on a light-wave rangefinder comprising a light emitting means for emitting a distance measuring light wave modulated by a predetermined modulation frequency, and a light receiving means for receiving a reflecting light wave reflecting from a target point to which said distance measuring light wave is directed, wherein a time delay between the distance measuring light wave and the reflecting light wave is utilized to determine the distance to the target point, characterized by the provision of at least one photoconduction means for conducting the distance measuring light wave and the reflecting light wave, and at least one single objective optical means for projecting the distance measuring light wave form the photoconduction means towards the target point, for condensing the reflecting light wave reflecting from the target point and for guiding the light wave to the photoconduction means.

With this structure, the light-wave rangefinder in accordance with the present invention can be used in wider fields other than the surveying field, can be used under the environment in which the light-wave rangefinder has not been so far installed due to the possibility of explosion caused by the electronic circuit, and can be used for various measurements in which distance is the dimension.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
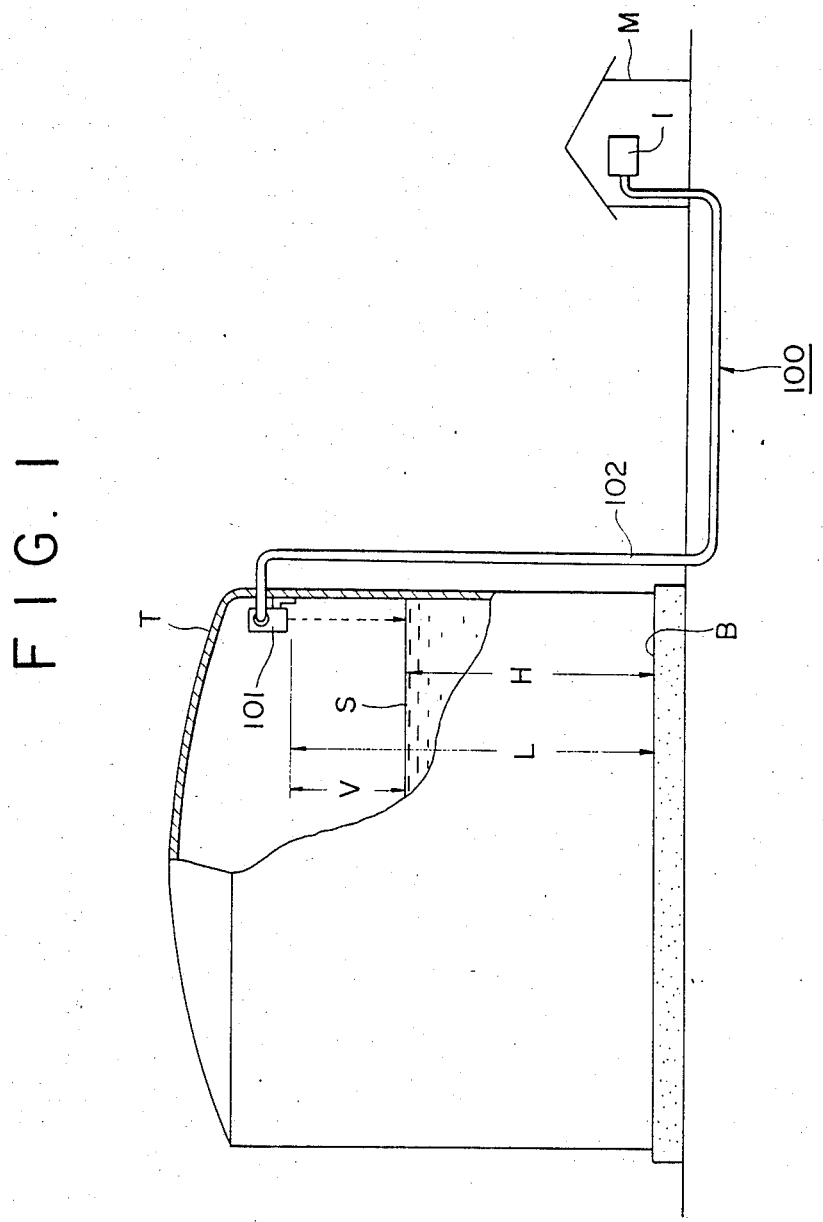
FIG. 1 is a schematic diagram showing the way of use of a first embodiment of the invention.

FIG. 1 is schematic view showing an example in which a light-wave rangefinder is utilized for measuring the liquid level in a crude oil tank making use of an optical adapter in accordance with the present invention. On the inner wall of a crude oil tank T is mounted a front objective lens system 101, which is an objective optical means of an optical adapter 100 with an objective lens opposed to a crude oil surface S. The objective lens system 101 is connected to a light-wave rangfinder 1 installed in a management house M through a photoconduction pipe 102 which is a photoconduction means. A measuring light emitted from the light-wave rangfinder 1 is transmitted through the photoconduction pipe 102 and projected from the objective lens system 101 towards the crude oil surface S. The reflecting light from the surface S is again received by the objective lens system 101, after which the light is transmitted to the light-wave rangefinder 1 through the photoconduction pipe 102. A time delay, for example, a phase difference between the light reflected at the liquid surface and the aforesaid distance measuring light, is measured by the light-wave rangefinder 1, and the distance from the objective lens system 101 and the crude oil surface S is determined precisely from said phase difference. The distance L from the bottom surface B of the tank T to the objective lens system 101 is measured beforehand, and the height H of crude oil surface can be determined with accuracy from the difference between the value of said distance L and the aforementioned measured value.

Figure 2:
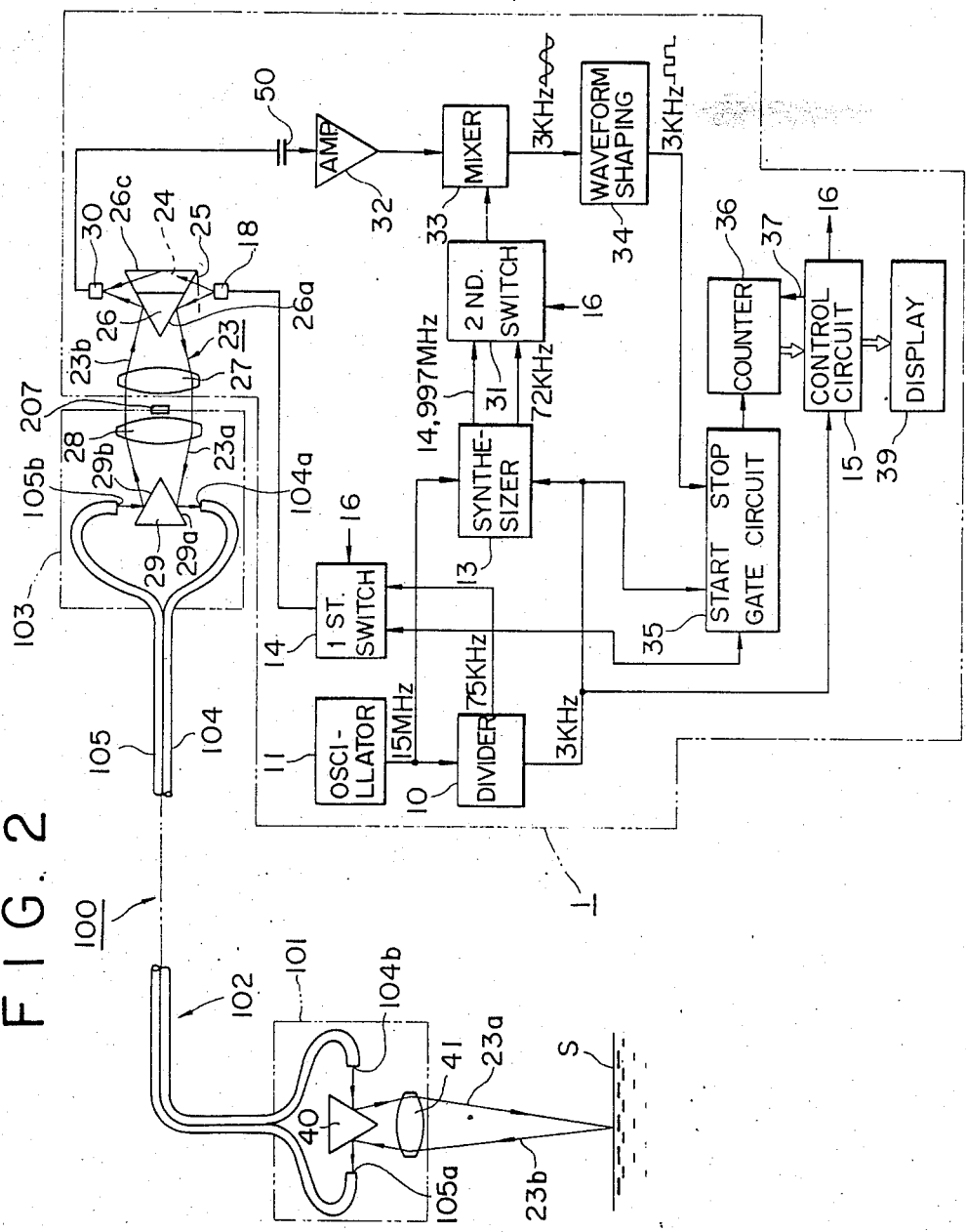
FIG. 2 is a block diagram showing the construction of the embodiment.

FIG. 2 is a block diagram of the above-described liquid surface height measuring system. This liquid surface height measuring system consists of the light-wave rangefinder 1 and the optical adapter 100 connected thereto.

A frequency divider 10 of the light-wave rangefinder 1 divides a 15 MHz signal from an oscillator 11 to generate two signal of 75 KHz and 3 KHz. A synthesizer 13 generates a signal of 14.997 MHz which is a difference between 15 MHz from the oscillator and 3 KHz from the frequency divider 10 (15 MHz–3 KHz), and another signal of 72 KHz which is 24 times 3 KHz from the frequency divider 10. A first switch 14 is controlled by a signal 16 from a processing control circuit 15, so as to put out a signal of either 15 MHz or 75 KHz.

A light emitting element 18 comprising a light emitting diode radiates a light modulated by the output signal of the first switch 14. The modulated light released from the light emitting element 18 is released to either distance measuring light path 23 or internal reference light path 24 by a shutter 25 by which the distance measuring light path 23 and internal reference light path 24 are switched. In the event the distance measuring light path 23 is selected, the modulated light is reflected at an inclined surface 26a of a prism 26 and thereafter shaped into a bundle of parallel light rays by means of an objective lens 27 and is incident upon an objective lens 28 of an objective lens system of an optical adapter 100. The distance measuring light 23a projected from the objective lens 28 is reflected at a reflecting surface 29a of a prism 29 and focused at an incident end 104a of an optical fiber 104 which constitutes a photoconduction pipe 102. A secondary light source image of the light emitting element 18 is thus formed on the end 104a of the optical fiber 104. The light transmitted through the optical fiber 104 is projected from the other end 104b of the optical fiber 104 onto a reflecting prism 40 in the housing (not shown) of the objective lens system 101. The light 23a reflected by the prism 40, after passing through an objective lens 41, falls on the crude oil surface S which is the target. The light reflected at the liquid surface S, after travelling past the lens 41 and the prism 40, enters an incident end 105a of optical fiber 105 which constitutes the photoconduction pipe 102 together with the aforementioned optical fiber 104. the reflected light is thrown out from the opposite end 105b after passing through the optical fiber 105. Since the end 105b is located at a position conjugate with a focus of the objective lens 28, the light 23b from the optical fiber 105 is, after being reflected at a reflecting surface 29b of the prism 29, formed into a bundle of parallel light rays by the objective lens 28 and enters the light-wave rangefinder 1. The objective lens 27 of the light-wave rangefinder 1 causes the light 23b to fall upon a light receiving element 30, which comprises an avalanche photodiode, past the prism 26. When the internal reference light path is selected by the shutter 25, the modulated light from the light emitting element 18 is reflected at an internal reflecting surface 26c of the prism 26 and is directly incident upon the light receiving element 30.

This internal reference light path is provided so as to prohibit an error in distance measuring data from being generated by changes in phase due to a temperature drift or the like of an electric circuit which constitutes the lightwave rangefinder itself. The measured value by the internal reference light path is subtracted by the measured value by the distance measuring light path to obtain accurate distance measuring data.

A second switch 31 is controlled by the signal 16 from the processing control circuit 15 so as to provide an output signal of either 14.997 MHz or 72 KHz. The output from the light receiving element 30, past a capacitor 50, is amplified by an amplifier 32 whose output is supplied to the mixer 33. The mixer 33 mixes the signal from the amplifier 32 and the signal from the second switch 31 to form a beat signal, which is detected to produce an output sine wave of 3 KHz. A waveform shaping unit 34 shapes the sine wave of 3 KHz into a rectangular wave. A gate circuit 35 receives the 3 KHz signal from the frequency divider 10 as a start signal, and the signal from the waveform shaping unit as the stop signal, and allows between the start and stop signals the 15 MHz signal from the oscillator 11. This signal is counted by the the counter 36 to measure the phase difference. The counted value obtained by the counter 36 is the total number obtained by N times of measurement. To know the frequency of N times, the signal of 3 KHz from the frequency divider 10 is supplied to the processing control circuit 15. Upon termination of counting of N times, a reset signal 37 is supplied from the processing control circuit 15 to the counter 36 so that the counter 36 is reset. The counted value of measurement of N times is multiplied by 1/N in the processing control circuit to obtain an average value, which is converted into distance which is then displayed on a display 39. It is noted that the distance here obtained is the sum (V+l) of the length l of the optical adapter and the distance V from the front end of the optical adapter to the liquid surface. Since the length of the optical adapter is known, and the distance L+l to the bottom surface of the tank has been pre-measured precisely, the liquid surface height H can be obtained by $$H = (L+l) - (V+l)$$

This calculation is executed by the processing control circuit.

For setting the output of the mixer 33 to 3 KHz, the output signal of the first switch 14 and the output signal of the second swich 31 are controlled by the signal 16 from the processing control circuit 15 such that their frequencies are 15 MHz and 14.997 MHz respectively, or 75 KHz and 72 KHz respectively. The two modulation frequencies for the light emitting element 18, 15 MHz and 75 KHz, corresponding to wave lengths 20 m and 4 Km respectively, are used for precise measurement and rough measurement respectively. Frequencies of 15 MHz and 75 KHz are reduced to 3 KHz by the mixer 33 to improve the resolving power of phase measurement or to reduce the phase of 15 MHz or 75 KHz to the phase of 3 KHz for measurement.

Figure 3:
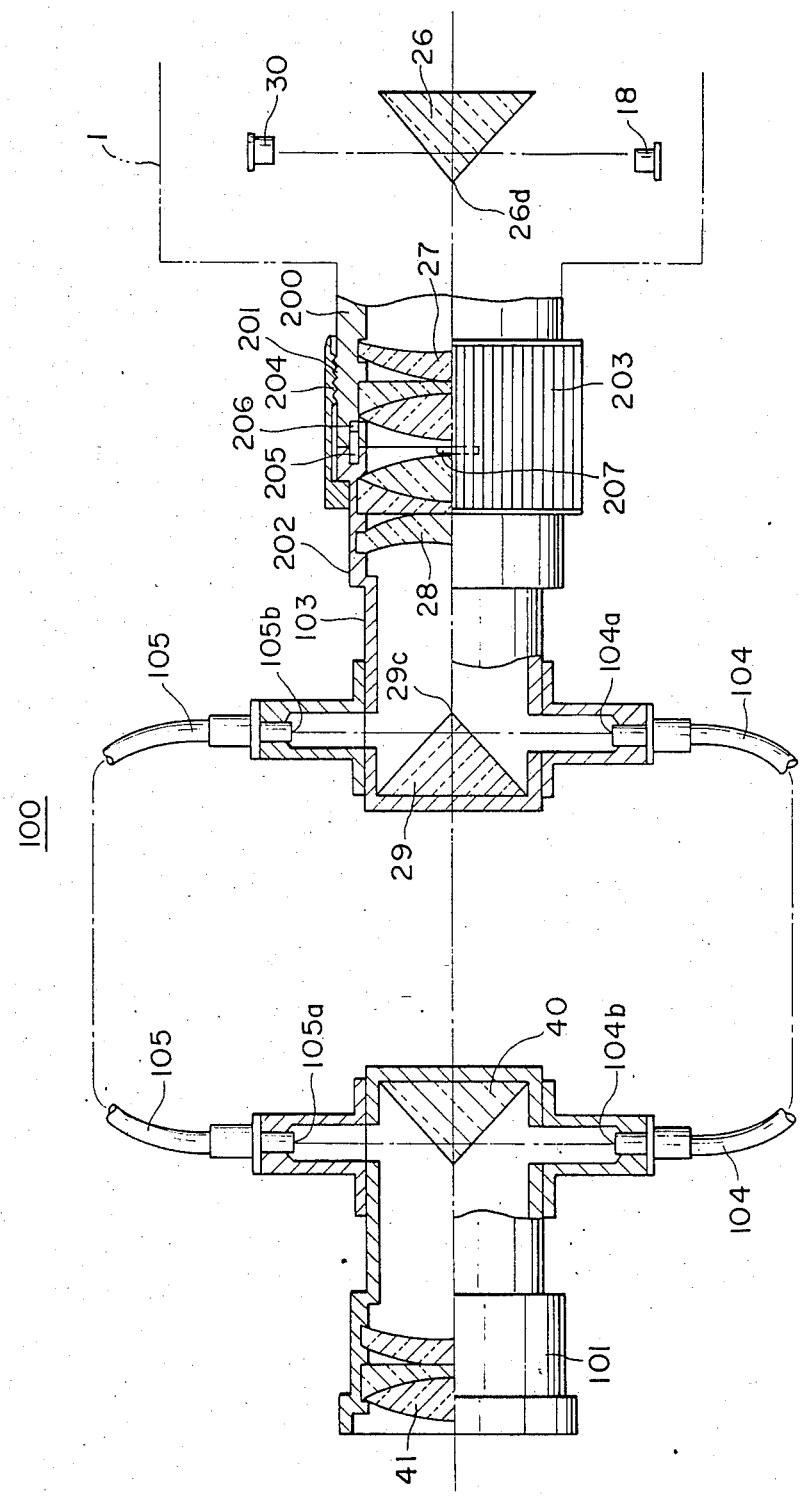
FIG. 3 is a partial sectional view showing part of the first embodiment.

FIG. 3 is a partial sectional view showing the construction of the optical adapter 100. Parts indentical to or equal to those shown in FIG. 2 are indicated by the same reference numeral, and duplicate explanation will be omitted. An objective lens mount 200 of the light-wave rangefinder 1 is formed with an external thread portion 201, threadedly engaged on which is an internal thread portion 204 of a mounting ring 203 fitted on an objective lens mount 202 of the objective lens system 103 of the optical adapter 100. The objective lens system 103 is thus connected to the lightwave rangefinder 1.

A locating pin 205 is provided on the fore end of the lens mount 202, and this pin is fitted into an engaging hole 206 formed in the lens mount 200 of the light-wave rangefinder, whereby optical axis of the objective lenses 27 and 28 are disposed in line and confronting edges 26d and 29c of the prisms 26 and 29 are disposed parallel with each other. In front of the objective lens 28 in the lens mount 202 there is provided an elongate diaphragm plate 207 laterally extending across the optical axis of the lens 28. This plate 207 serves to prevent interference between the light toward the target and the light from the target, which interference may degrade the measurement. In the illustrated embodiment, the objective lenses 27, 28 and 41 all have the same lens structure; use of lenses of the same structure results in reduction in manufacturing costs and contributes to stabilization of optical characteristics.

As will be understood from the above-described embodiment, only the front objective lens system 101 of the optical adapter 100 is installed internally of the crude oil tank T, and the body of the light-wave rangefinder may be installed interiorly of the management house M away from the tank. Therefore, measurement can be easily accomplished, and concentrated measurement of heights of the liquid surfaces S of a number of crude oil tanks T is possible. In addition, since the light-wave rangefinder body need not be installed within the tank T, there is no danger of explosion occuring due to short-circuiting or spark of an electronic circuit housed in the body itself, which is preferable in terms of explosion prevention.

Since the emitting optical fiber 104 and receiving optical fiber 105 which constitute the photoconduction pipe 102 are long, if an ordinary SI (Step Index) fiber is used, individual light rays may travel different distance in the optical fiber; the difference may result in phase difference between the individual light rays, which will cause an error in distance measuring data. For solving this drawback, GI (Graded Index) fiber should be used. Any light rays will travel the same distance through a GI fiber, so that such fiber will cause no phase difference.

The height of the liquid level is measured based on a phase difference as a time lag between the distance-measuring light waves and reflected distance-measuring light waves. The above liquid level height-measuring apparatus according to the aforementioned first embodiment is adapted to directly measure the distance to be measured including the whole length of the photoconduction pipe. The height of the liquid level is determined by subtacting the whole length of the photoconduction pipe as a known physical amount from the measured distance.

However, as the crude or the petrolum oil tanks have been large-scaled and a number of the crude oil tanks have come to be concentratively controlled, the distance from the control housing to the respective crude oil tanks increases and the whole length of the photoconduction pipe accordingly increases. Thus, it is necessary to employ from several ten to one hundred and several ten meters in length of the photoconduction.

However, with the increase in length of the light wave transmission piping member, expansion and contraction amounts due to temperature changes increases, so that the whole length of photoconduction pipe can no longer be regarded as the known physical amount, and errors in the measured distance take place due to the expansion and contraction of the photoconduction pipe owing to temperature changes. The errors of the measured distance due to the expansion and contraction of the photoconduction pipe owing to the temperature changes take place when a photoconductive wave pipe of a refraction and reflection optical system is employed.

Further, since difference in the transmission distance between the distance-measuring light waves and the reflected distance-measuring light waves both transmitted inside of the optical fiber which is curved as the photoconduction pipe is proportional to the whole length of the optical fiber, the phase difference between the distance-measuring light waves and the reflected light waves increases with the increase in length of the optical fiber due to the above proportional relation to produce errors in the measured distance. In addition, the phase difference between the distance-measuring light waves and the reflected light waves changes due to bent portions on way of the arranged optical fiber and bending thereof by wind, and errors of the measured distance induced thereby increases with increase in length of the optical fiber.

The second through sixth described hereinafter, of the present invention has been made taking the above-mentioned circumstances into consideration, and is aimed at the provision of a liquid level height-measuring apparatus which can eliminate errors of measured distances due to increase in length of a light wave transmission piping member to the utmost.

Figure 4:
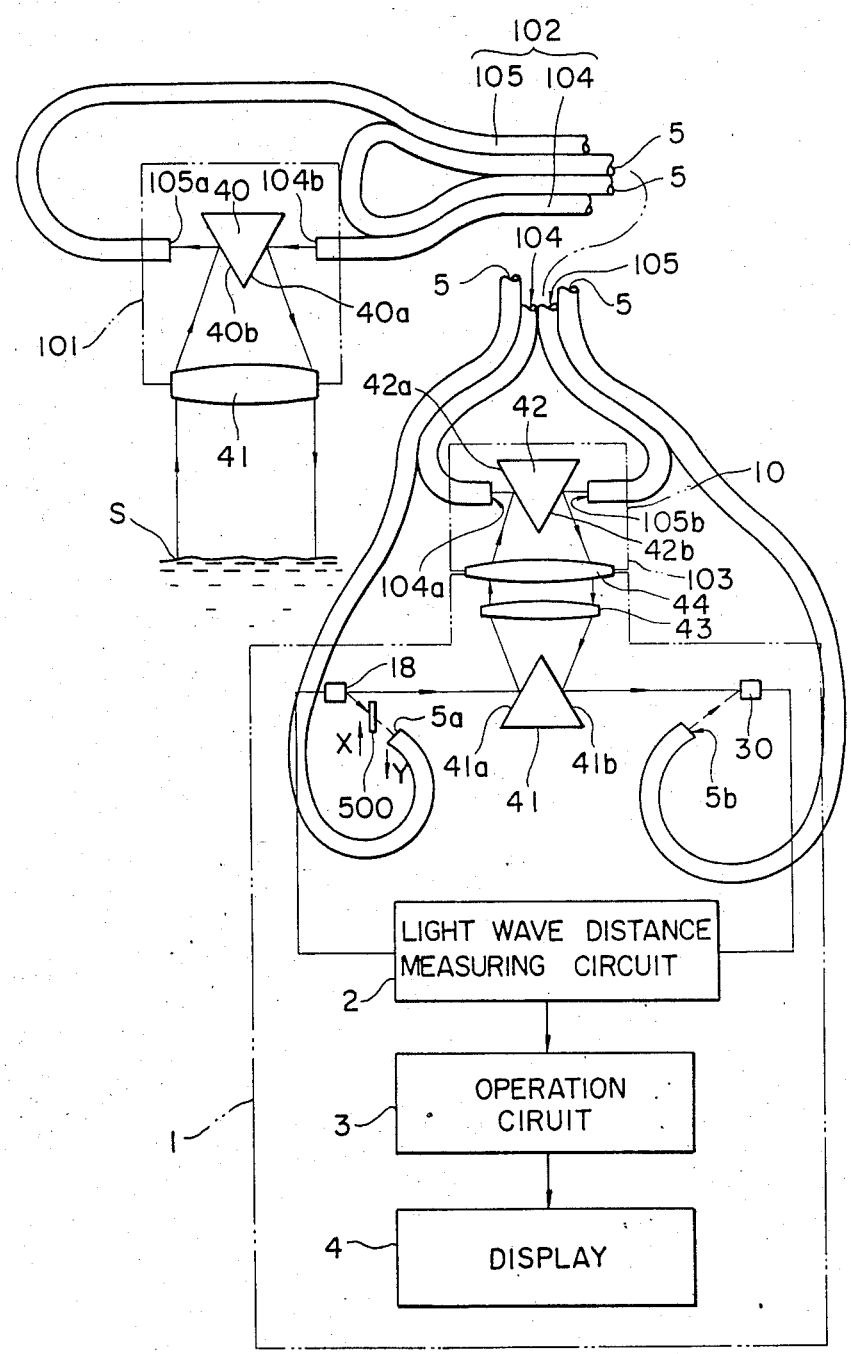
FIG. 4 is a schematic diagram showing a second embodiment of the invention.

FIG. 4 shows the second embodiment of this invention. The distance-measuring light wave generating means is provided with a luminescent diode 18, which faces a reflecting face 41a of a reflection prism 41 through a shutter member 500. The light receiving means has a light receiving diode 30, which faces a reflecting face 41b of the reflection prism 41. When the shutter member 500 is located at a position shown in FIG. 4, the distance-measuring light waves optically modulated at a given modulation frequency are led to the reflection prism 41 and reflected on the reflecting face 41a thereof, and then the reflected light waves are led to the incident face 104a of the outward optical fiber 104 through the lens 43 and 44. The distance measuring light waves are transmitted inside of the outward optical fiber 104 and ejected from the ejecting face 104b thereof. Then, the light waves are led to the objective lens 41 where they are converted into a beam of parallel light rays, and the light rays are irradiated upon the crude oil surface S. Upon being reflected on the crude oil surface S, the distance-measuring light waves are converted into the reflected distance-measuring light waves. The reflected distance-measuring light waves are condensed by the objective lens 41 again and reflected by the reflecting face 40b of the reflection prism 40. The reflected distance-measuring light waves are transmitted inside of the return optical fiber 105 and ejected from the ejecting face 105b thereof, the ejected light waves being led to the light receiving element through the reflection prism 42, the lenses 44 and 43 and the reflection prism 41 to be photoelectrically converted. The reflection prisms 42 and the lens 44 constitutes a joint optical system 10.

The light wave distance-measuring circuit 2 is adapted to generate a processing signal to an operation circuit 3 on the basis of the distance-measuring light waves and the reflected distance-measuring light waves. The operation circuit 3 is adapted to calculate a measurement distance L including the length l of the optical fiber 102 on the basis of the distance-measuring light waves and the reflected distance-measuring light waves. A reference photoconduction pipe 5 is arranged between the light wave distance-meter main body 1 and the objective optical system unit 101. The reference photoconduction pipe 5 is disposed along the optical fiber 102, and has substantially the same physical properties as those of the optical fiber 102. Further, the length l' of the reference photoconduction pipe 5 is designed to be almost the same as the length l of the optical fiber 102. An optical fiber is used as the reference photoconduction pipe 5, and is provided with an incident face 5a and an ejecting face 5b. The incident face 5a is opposed to the luminescent diode 18, and the ejecting face 5b is opposed to the light receiving element 30. When the shutter 500 is moved in the arrow direction X, the reference optical fiber 5 receives the distance-measuring light waves generated from the luminescent diode 18 as reference light waves. The reference light waves are circularly transmitted inside of the reference optical fiber 5, ejected toward the light receiving diode 30 from ejecting face 5b thereof and received by the light receiving diode 30.

When the shutter member 500 is moved in the arrow direction Y, the distance-measuring light waves ejected toward the reflection prism 41 is shut. The operation circuit 3 preliminarily measures the whole length l' of the reference optical fiber 5, and the height H of the liquid level is determined by subtracting the whole length l from the measured distance TL while the whole length l' being regarded as the whole length l of the optical fiber 102. A calculating formula therefore is shown in th following:

$$H = L - (TL - l)$$

wherein L is a distance from the tip end of the objective lens-optical system unit 101 to the bottom B of the crude oil tank shown in FIG. 1, and the distance TL is the known physical amount.

The height H of the liquid level is indicated as a measured datum by a display 4.

In the illustrated second embodiment, the reference photoconduction pipe 5 is formed completely independent of the outward optical fiber 104 and the return optical fiber 105 for measuring the distance. However, the present invention is not restricted thereto.

For instance, as mentioned below, the outward optical fiber and/or the return optical fiber may be also used for the reference photoconduction pipe when a light branching means and a light switch are used.

Figure 5:
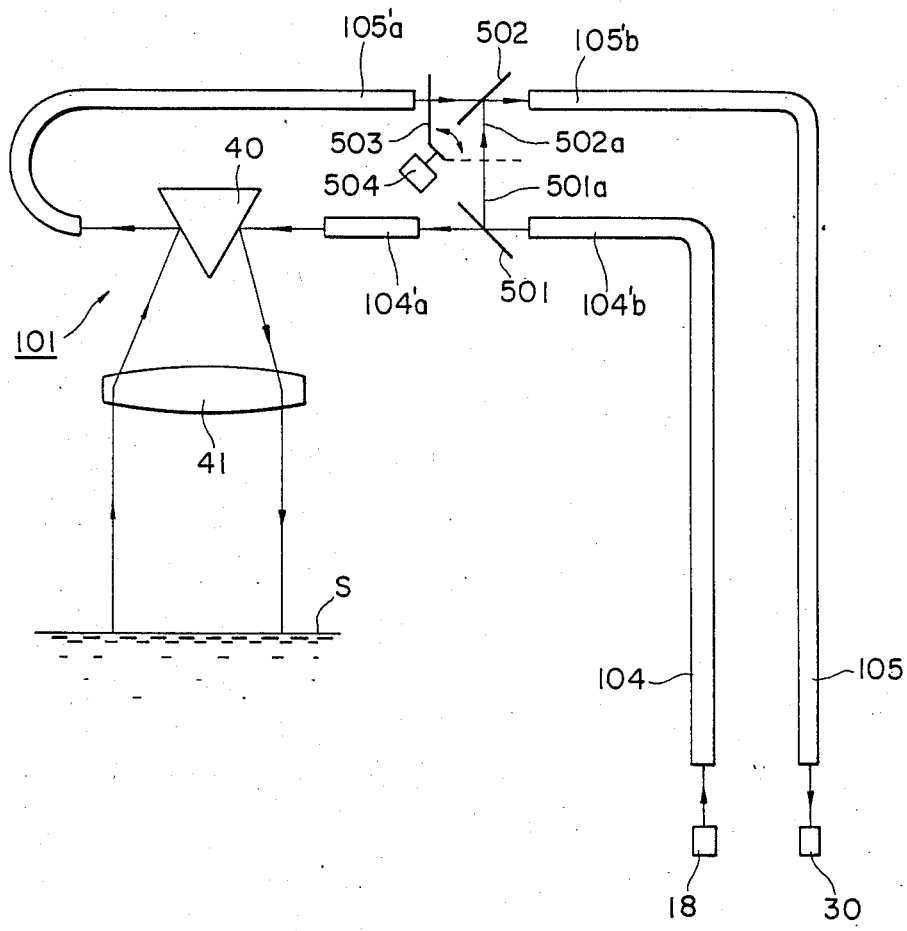
FIG. 5 is a schematic diagram showing a third embodiment of the invention.

FIG. 5 shows an third embodiment of this invention described such a modification in which an outward optical fiber is divided into 104a' and 104b' in the vicinity of an objective optical system unit 101, and a half mirror 501 as a light branching means is interposed therebetween. On the other hand, a return optical fiber 105 is divided into 105a' and 105b' in the vicinity of the objective optical system unit 101, and a half mirror 502 is interposed therebetween. A reflection light path 501a of the half mirror 501 is coincident with an incident light path 502a of the other half mirror 502. By so doing, after light rays from the luminescent diode 18 are transmitted through the outward optical fiber 104b', a part thereof is reflected by the half mirror 501 and reflected by the half mirror 502 again to provide reference light waves to be fed to the light receiving element 30 through the return optical fiber 105b'. A chopper 503 is so disposed as to be alternatively inserted between the half mirror 502 and the ejecting face of the return optical fiber 105a' and between the half mirror 501 and the half mirror 502 so that the light receiving element 30 may receive the distance-measuring light waves or the reference light waves selectively. Switching of the chopper 503 is performed by a rotary solenoid 504.

By the above construction, the outward and return optical fibers 104 and 105 for measuring the distance may be also used for the reference light waves. If the liquid level to be measured is strongly flammable and therefore the above rotary solenoid 504 can not be used from the explosion-preventing standpoint of view, it may be that while the return optical fiber 105 is not divided, the reference light wave optical fiber for transmitting the light waves reflected from the half mirror 501 is provided for the return side only along the return optical fiber for measuring the distance and a light path switch means is provided for selectively introducing the light waves from the distance-measuring return photoconduction pipe and the light waves from the reference light wave return photoconduction pipe to the light receiving element 30. In this case, the outward optical fiber 104 serves as the common outward photoconduction pipe for both the distance-measuring light waves and the reference light waves.

Figure 6:
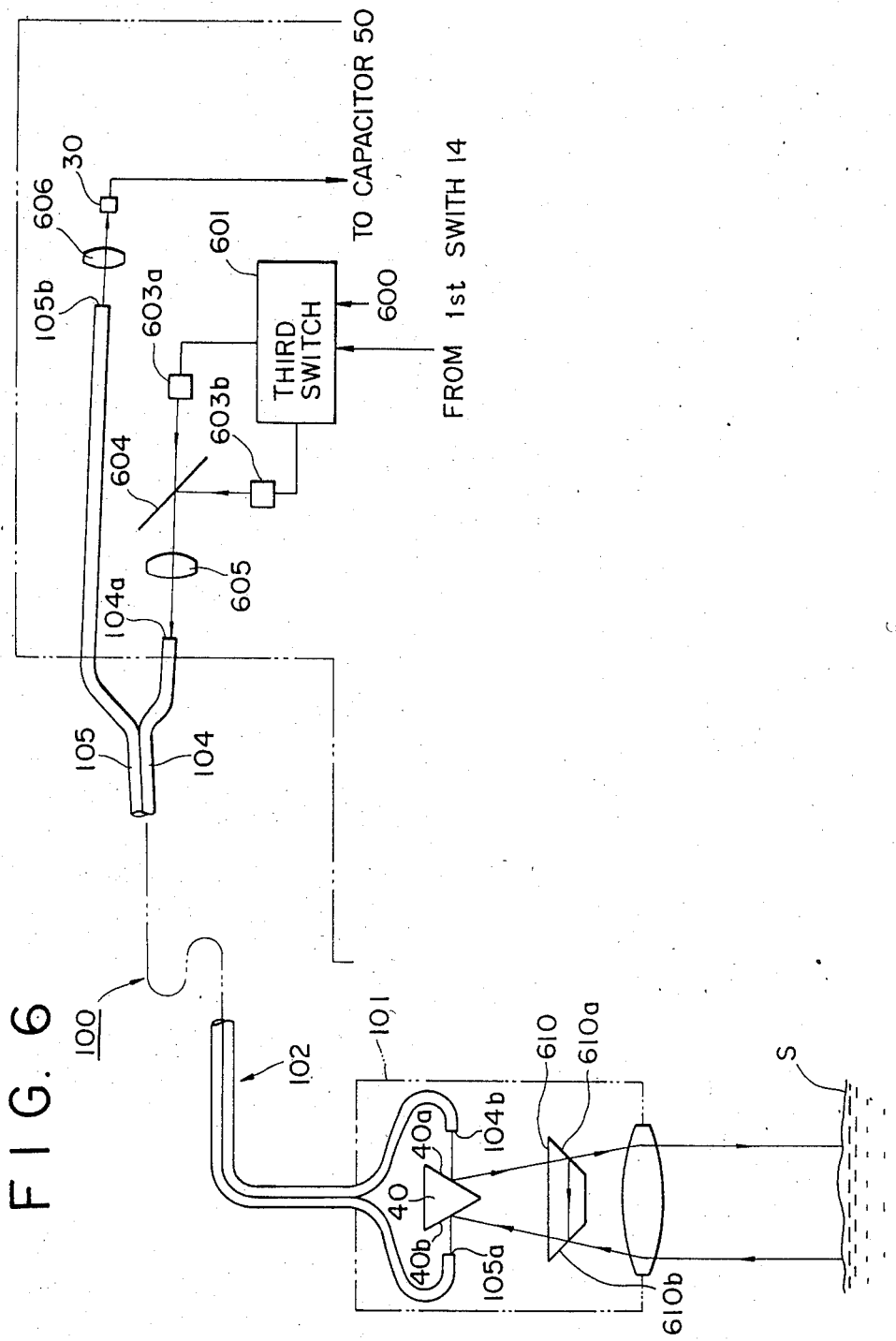
FIG. 6 is an optical system circuit view of an objective optical system unit, photoconduction piping member, and light generating and receiving section of a forth embodiment of the liquid level height measuring apparatus acoording to the present invention.

FIG. 6 illustrates an objective optical system unit, photoconduction piping member, and light generating and receiving sections of a fourth embodiment of this invention.

The incident face 104a of the outward optical fiber 104 which functions as photoconduction piping member faces a lens 605, and an ejecting face 104b thereof faces the reflecting face 40a of the reflection prism 40. The incident face 105a of the return optical fiber 105 which also functions as photoconduction piping member faces reflecting face 40b of the reflection prism 40, and its ejecting face 105b faces a lens 606. The distance-measuring light wave generating means is provided with luminescent diodes 603a, 603b, which are adapted to generate distance-measuring light waves with different wavelengths, respectively. The luminescent diode 603a generates, for instance, near infrared rays of a middle wavelength of 820 nm. The luminescent diode 603b generates, for example, near infrared rays of a middle wave length of 860 nm. The near infrared rays generated by the luminescent diode 603a are used as the reference light waves for measuring the length of the photoconduction transmission piping member. The near infrared rays generated by the luminescent diode 603b are used as the distance-measuring light waves for measuring the height of the liquid level.

The light wave distance-meter main body of this embodiment has the same construction and functions as that of the above-mentioned first embodiment, thus, the light wave distance-meter main body of this embodiment is not described to omit the duplicate explanations.

The oscillation output selected in the first switch 14 shown in FIG. 2 is inputted into a third switch 601 which has a function to make alternatively selection between a luminescent diode 603a and a luminescent diode 603b to be radiated on the basis of a control signal 600 generated in the processing control circuit 15 shown in FIG. 2. The reference light wave generated at the luminescent diode 603a penetrates a half mirror 604 to be led to a lens 605 by which the light wave is caused to form an image at an incident face 104a. The distance-measuring light wave generated at the luminescent diode 603b is reflected by the half mirror 604 to be led to the lens 605. The reflected distance-measuring light wave is caused to form an image at the incident face 104a by the lens 605. The half mirror 604 functions as a Dichroic mirror to penetrate near infrared rays of a middle wavelength of 820 nm of the reference light wave but to reflect near infrared rays of a middle wavelength of 860 nm of the distance-measuring light wave. The distance-measuring and the reference light waves led to the incident face 104a of the outward optical fiber 104 are transmitted within the outward optical fiber 104 to be led to the ejecting face 104b thereof. The light waves are ejected from the ejecting face 104b, are reflected at the reflecting face 40a of the reflection prism 40, and are led toward the objective lens 41.

The objective lens 41 is so arranged that the location of its focal point may be optically in coincidence with the ejecting face 104b and the incident face 105a. A reflection prism 610 as a light wave selecting means is positioned between the reflection prism 40 and the objective lens 41 while being spaced therefrom at specific intervals. The reflection prism 610 is provided with a Dichroic mirror faces 610a and 610b. The Dichroic mirror face 610a has a function to reflect the reference light wave of the middle wavelength of 820 nm but to penetrate the liquid level height-measuring distance measuring light wave with the middle wavelength 860 nm. The distance measuring light wave is penetrated through the reflection prism 610 and is then converted into a parallel light beam by the objective lens 41. The parallel light beam is reflected at the liquid level surface S of crude oil to be converted to refelcted distance-mearsuring light wave. The reflected distance-measuring light wave is collected by the objective lens 41 again and is penetrated through the reflection prism 610 to be led to the reflecting face 40b of the reflection prism 40. The reflected distance-measuring light wave is reflected again at the reflecting face 40b to be led to the incident face 105a of a return optical fiber 105 at which the light waves form an image. The distance-measuring light wave is transmitted within the return optical fiber 105 to be led to the ejecting face 105b thereof and then ejected toward a lens 606. The lens 606 has a function to collect the distance-measuring light wave and cause the light wave to form an image at a light receiving face of the light receiving diode 30 constituting a part of a light receiving means. After the reference light waves is ejected from the outward optical fiber 104, it is reflected at the Dichroic faces 610a and 610b of the reflection prism 610 and is led to the incident face 105a of the return optical fiber 105 as it is without passing through the objective lens 41. Then, the reference light wave is transmitted within the return optical fiber 105, and is caused to make an image at a light receiving face of a light receiving diode 30 by the lens 606. The light receiving diode 30 has a function to make photoelectric conversion of both the distance-measuring light waves of the middle wavelength of 820 nm and the reference light waves of the middle wavelength of 860 nm at substantially the same sensitivity.

Figure 7:
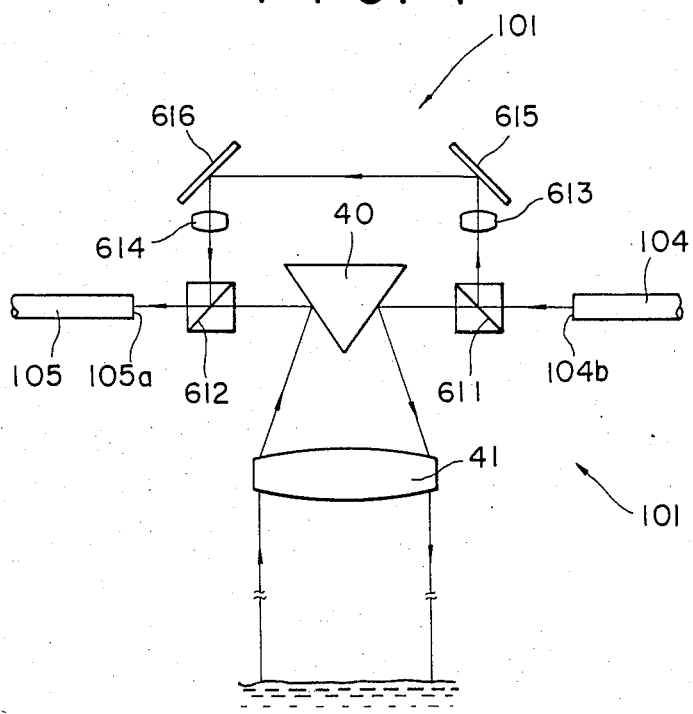
FIG. 7 is an optical system circut view of an object optical system unit a fifth embodiment of the liquid level height measuring apparatus according to the present invention.

FIG. 7 is an optical system circuit view of an objective optical system unit 101 showing a fifth embodiment of the liquid level height-measuring apparatus according to the present invention. The light wave selecting member is constituted by Dichroic mirror 611 arranged between the reflection prism 40 and the outward optical fiber 104, a Dichroic mirror 612 arranged between the reflection prism 40 and the return optical fiber 105, and collimeter lenses 613 and 614 and reflection mirrors 615 and 616 for leading the reference light wave reflected at the Dichroic mirror 611 to the Dichroic mirror 612. The Dichroic mirrors 611 and 612 have a function to penetrate the distance-measuring light wave but to reflect the reference light wave.

Figure 8:
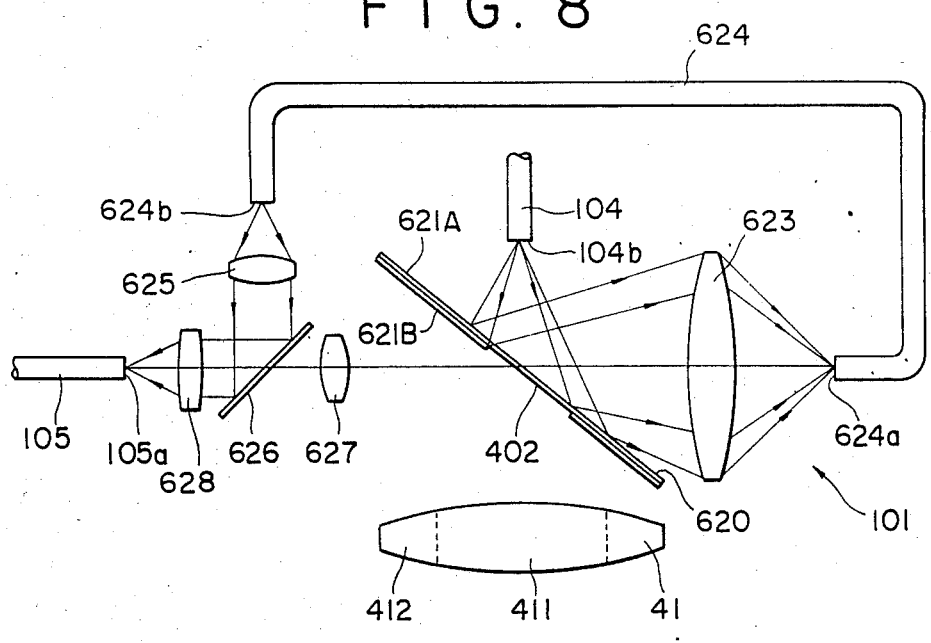
FIG. 8 to 10 are views illustrating a sixth embodiment of the liquid level height measuring apparatus according to the present invention, FIGS. 8 and 9 being optical system circuit views of an objective optical system unit thereof and FIG. 10 being a plane view of an objective lens shown in FIGS. 8 and 9.
Figure 9:
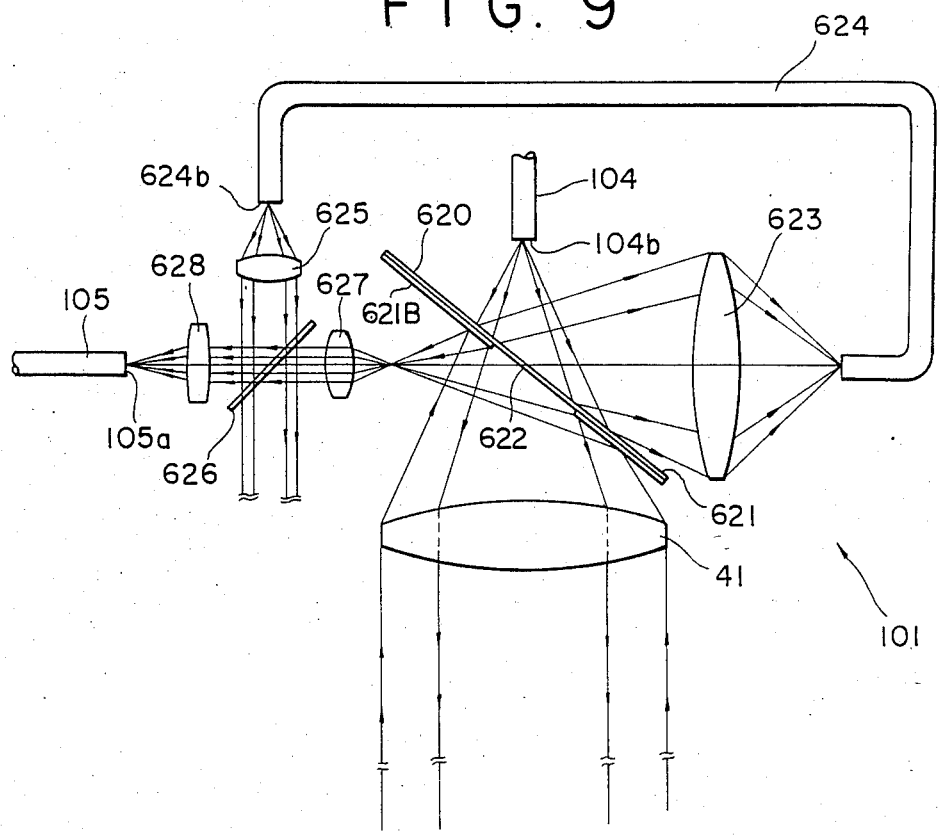
Figure 10:
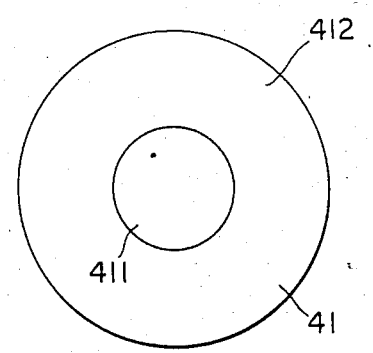

FIGS. 8 through 10 show an optical system circuit view of an objective optical system unit 101 showing a sixth embodiment of the liquid level height-measuring apparatus according to the present invention. According to this embodiment, as shown in FIG. 10, the central portion of an objective lens 41 is used as a round portion (411) for converting the distance-measuring light wave into a parallel light beam and leading it upon the surface S of the liquid level of the crude oil, while the peripheral portion is used as a light-collecting portion (412) for collecting the reflected distance-measuring light waves. In the illustrated embodiment, a distance-measuring light wave selecting means is constituted by an inclined mirror 620, a lens 623, an optical fiber 624, a collimeter 625, a Dichroic mirror 626, and collimeters 627, and 628. The Dichroic mirror 626 is arranged betweeen the collimeter lenses 627 and 628. The inclined mirror 620 has a reflecting face 621A and a Dichroic opening 622.

The reference light wave ejected from an outward optical fiber 104 is reflected both by the reflecting face 621A and the Dichroic opening 622, is led to an incident face 624a of the optical fiber 624 by the lens 623, and is ejected from an ejecting face 624b after being transmitted within the optical fiber 624. The ejected light wave is converted into a parallel light beam by the collimeter lens 625, which parallel light beam is reflected by the Dichroic mirror 626 and is led to the return optical fiber 105 through the collimeter 628. Then, the reference light wave is transmitted within the return optical fiber 105, and is led to the light receiving element 30.

Only the distance-measuring waves which penetrate the Dichroic opening 622 are led to the round portion 411 of the objective lens 41. This reflected on the reflecting face 621A is led to the optical fiber 624, and is ejected from the ejecting face 624b to be irradiated to the Dichroic mirror 626 as a parallel light beam. Since the Dichroic mirror 626 functions to penetrate the distance-measuring light wave, it is not led to the return optical fiber 105 to prevent the influence thereof upon the measurement of the distance of the photoconduction piping member. The distance-measuring light wave led to the round portion 411 of the objective lens 41 is reflected on the surfaces of the liquid level of the crude oil and is led to the objective lens 41 as the reflected distance-measuring light wave, which is collected by the light collecting portion 412 of the objective lens 41 and is reflected by the reflecting face 621B. The reflected distance-measuring light wave is then converted into a parallel light beam by the collimeter 627, which penetrates the Dichroic mirror 626 and is led to the collimeter lens 628. The collimeter lens 628 causes the parallel light beam to form an image at an incident face 105a. Thereafter, the reflected distance-measuring light wave is transmitted within the return optical fiber 105, and is received by a light receiving diode 30.

In FIG. 1, above-mentioned embodiment, the objective optical means 101 is attached to the upper portion of the side wall of the crude oil tank T such that the optical axis of an objective lens (not shown) thereof may be perpendicular to the liquid level surface S. This attaching is performed in the state that no crude oil is contained in the crude oil tank T. When crude oil is stored in such a crude oil tank T, the tank is deformed and a deformation amount varies depending upon the stored amount of the crude oil.

The side wall of the crude oil tank T is largely deformed sidewise in an arch fashion by the crude oil stored therein and the upper wall is relatively largely deformed toward a flattening direction. Therefore, the objective optical means 101 is largely inclined in this case. As a result, even if the distance-measuring light waves are irradiated upon the liquid level surface S from the objective optical means 101, the reflected light waves from the liquid level surface S do not return to the objective optical means 101. Thus, it becomes impossible that the reflected light waves are received by the objective lens of the objective optical means 101 to measure the height H of the above-mentioned liquid level S. This poses a problem.

Furthermore, in the case that the objective optical means 101 and the optical fiber 102 as the light wave transmission means are connected together and supported inside of the crude oil tank T, the centroid of the objective optical means 101 may deviate due to the weight of the optical fiber 101 itself depending upon the arranged state of the optical fiber 101, external vibrations, etc. If the centroid deviates, the orientating direction of the objective optical means 101 is not perpendicular (an normal state) with respect to the liquid level surface S, so that there is a fear that the measurement of the height of the liquid level S becomes impossible.

Figure 11:
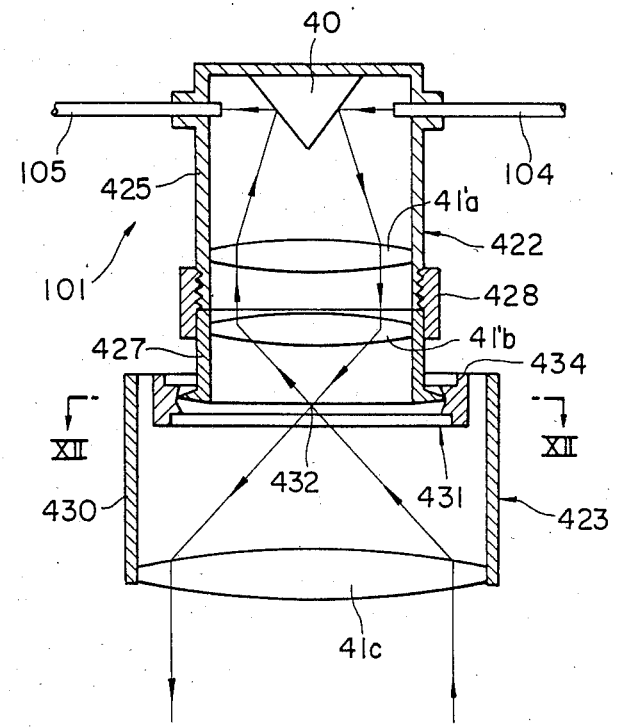
FIGS. 11 to 13 are views showing the seventh embodiment of the liquid level height measuring apparatus according to the present invention, FIG. 11 being a sectional front view of a principal objective optical system unit, FIG. 12 being a sectional view taken along a XII—XII line of FIG. 11, and FIG. 13 being a sectional front view of the principal objective optical system unit illustrating a function.
Figure 12:
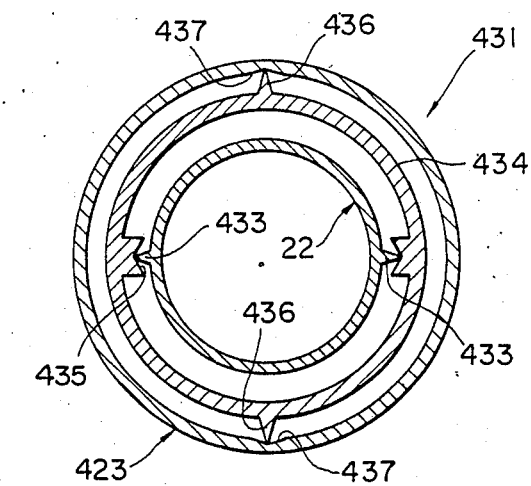
Figure 13:
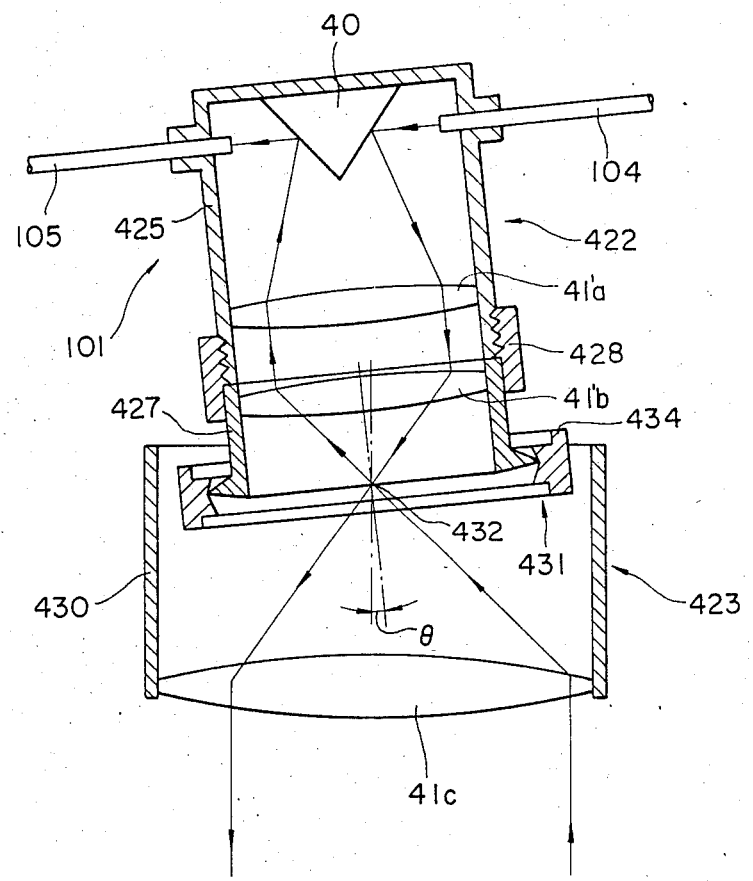

In FIGS. 11 to 13 which show a seventh embodiment of this invention, an objective optical means 101 is constituted by an objective optical unit 422 and an auxiliary optical unit 423. The objective optical unit 422 is constituted by an upper casing 425 containing the prism 40 and an objective lens 41′a, a lower casing 427 containing a relay lens 41′b, a couple ring 428 integrally coupling the upper casing 425 and the lower casing 427, etc. The auxiliary optical unit 423 is constituted by an objective lens 41c and a casing 430 containing and supporting the objective lens 41c. The auxiliary optical unit 423 is integrally connected to the objective optical unit 422 by the below-mentioned gimbal mechanism 431 as a kind of suspension support mechanisms. The focal point 432 of the relay lens 41b is coincident with that of the objective lens 41c. For this reason, when the objective optical unit 422 and the auxiliary optical unit 423 are both directed perpendicularly with respect to a liquid level surface 11 (not shown), as shown in FIG. 11, the objective lens 41c receiving the light waves from the focal point 432 is so arranged as to eject the light waves perpendicularly upon the liquid level surface S and receive the reflected perpendicular light waves from the liquid level surface S.

As shown in FIG. 12, two conical projections 433 are formed in right and left directions within the same horizontal plane of the focal point 432, and in the vicinity of the lower end of the objective optical unit 422, and engage with two conical recesses 435 formed in an intermediate ring 434, respectively. Further, two conical projections 436 are formed in the intermediate ring 434 in forward and rearward directions within the same horizontal plane of the focal point 432. The projections 436 engage with two conical recesses 437 formed near the upper edge of the auxiliary optical unit 423, respectively. The gimbal mechanism 31 is constituted by these projections 433, 436, the recesses 435, 437, the intermediate ring 34, etc. Therefore, when the objective optical unit 422 is rotated in a rightward or leftward direction, the objective optical unit 422 and the intermediate ring 434 rotate around the engaging portions between the projections 436 and the recesses 437 as fulcrum, while the auxiliary optical unit 423 does not rotate and maintains the normal posture thereof. When the objective optical unit 422 is rotated in a forward or rearward direction, only the objective optical unit 422 rotates around the engaging portions between the projections 433 and the recesses 435 as fulcrum, while the auxiliary optical unit 423 does not rotate together with the intermediate ring 434 and the normal posture thereof is also maintained. Accordingly, even when the objective optical unit 42 is rotated around the focal point 432 as a center in any direction, the auxiliary optical unit 423 does not rotate and always keeps its normal posture.

The construction of this embodiment is as mentioned above. Next, a function thereof will be explained below.

The distance-measuring light wave generated from the light wave distance-measuring section is fed into the objective optical unit 422 through the optical fiber 104, and is reflected by the prism 40 and forms an image at the focal point 432 after passing through the objective lens 41′a and the relay lens 41′b. The distance-measuring light wave passing through the focal point 432 is perpendicularly irradiated upon the liquid level surfaces (not shown) through the objective lens 41c in the auxiliary optical unit 423. The light wave is perpendicularly reflected from the liquid level surface and passes through the focal point 432 after the objective lens 41c. Then, the reflected light wave passes through the relay lens 41b and the objective lens 41a, is reflected on the prism 40, and returned to the light wave distance-measuring section through the optical fiber 105. Thereby, the height of the liquid level is measured.

As shown in FIG. 13, when the upper wall of the crude oil tank or the like (not shown) to which the objective optical unit 42 is attached is deformed to rotate the objective optical unit 422 by an angle $\theta$, the rotation takes place around the focal point 432 as a center. Since the auxiliary optical unit 423 is not moved by the action of the gimbal mechanism 431, the distance-measuring light wave entering the objective optical unit 422 is perpendicularly irradiated upon the liquid level surface through the objective lens 41c after passing through the objective lens 41'a, the relay lens 41'b and the focal point 432 as in the state prior to the rotation of the objective optical unit 422. The light wave is perpendicularly reflected from the liquid level surface, and passes through the focal point 432 after the objective lens 41c. Thus, as in the case with the state prior to the rotation of the objective optical unit 422, the light wave returns to the light wave distance-measuring section through the optical fiber 105 in spite of the rotation of the objective optical 422. That is, even when the upper portion of the side wall of the crude oil tank or the like to which the objective optical unit 22 is attached is deformed to rotate the objective optical unit 22, the height of the liquid level can be equally measured as usual. The suspension support mechanism for the auxiliary optical unit may be constituted as a mechanism for hanging the auxiliary optical unit by means of three wires instead of the gimbal mechanism.

Figure 14:
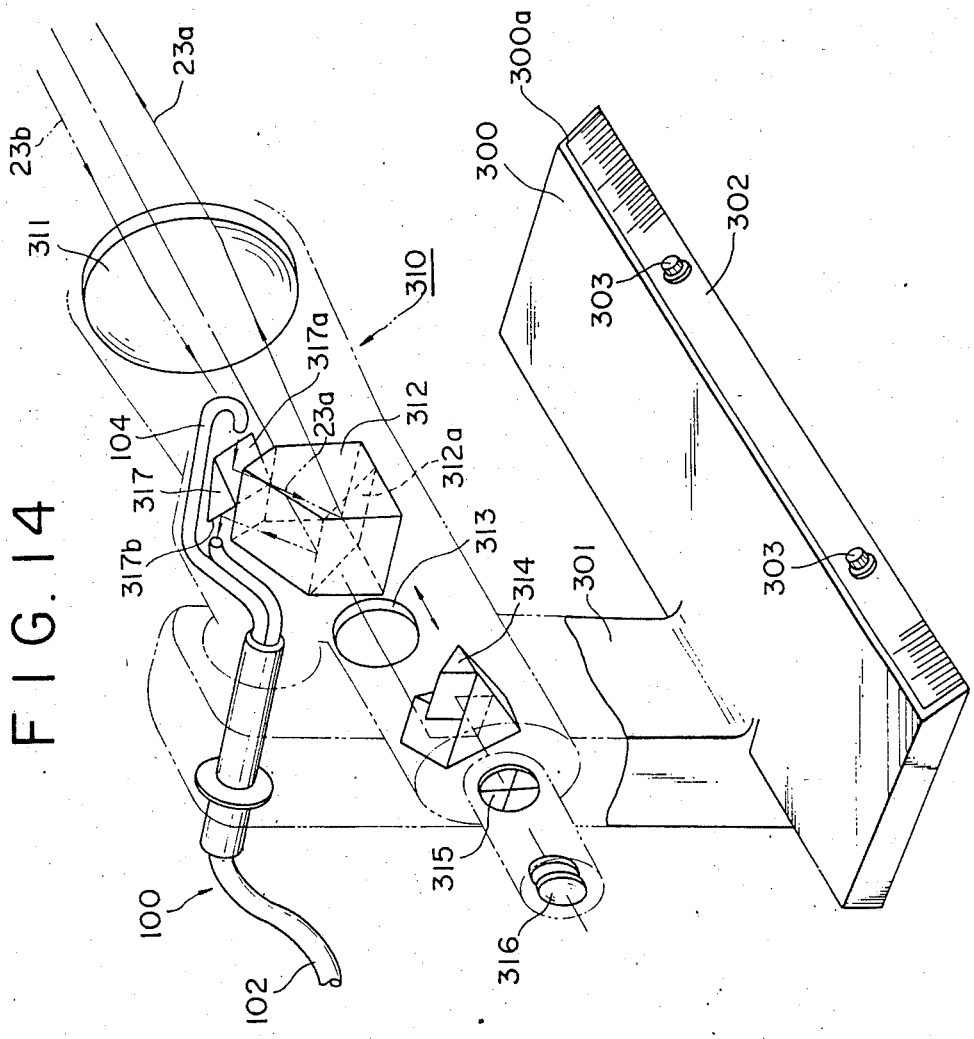
FIG. 14 is a diagram showing a eighth embodiment of the present inveition.

FIG. 14 shows a eighth embodiment of the optical adapter in accordance with the present invention installed in a light-wave alidade. The alidade comprises a base bed 300 to be placed on a flat plate and a telescope section 310 rotatably mounted on a column 301 of the base bed 300. A longitudianally extending incline surface 300a is formed on one side of the base bed 300. A measure 302 of a desired scale may be mounted on the inclined surface 300a by mounting screws 303, which is used for plotting points on a recording paper on the flat plate in accordance with the measurements.

Figure 15:
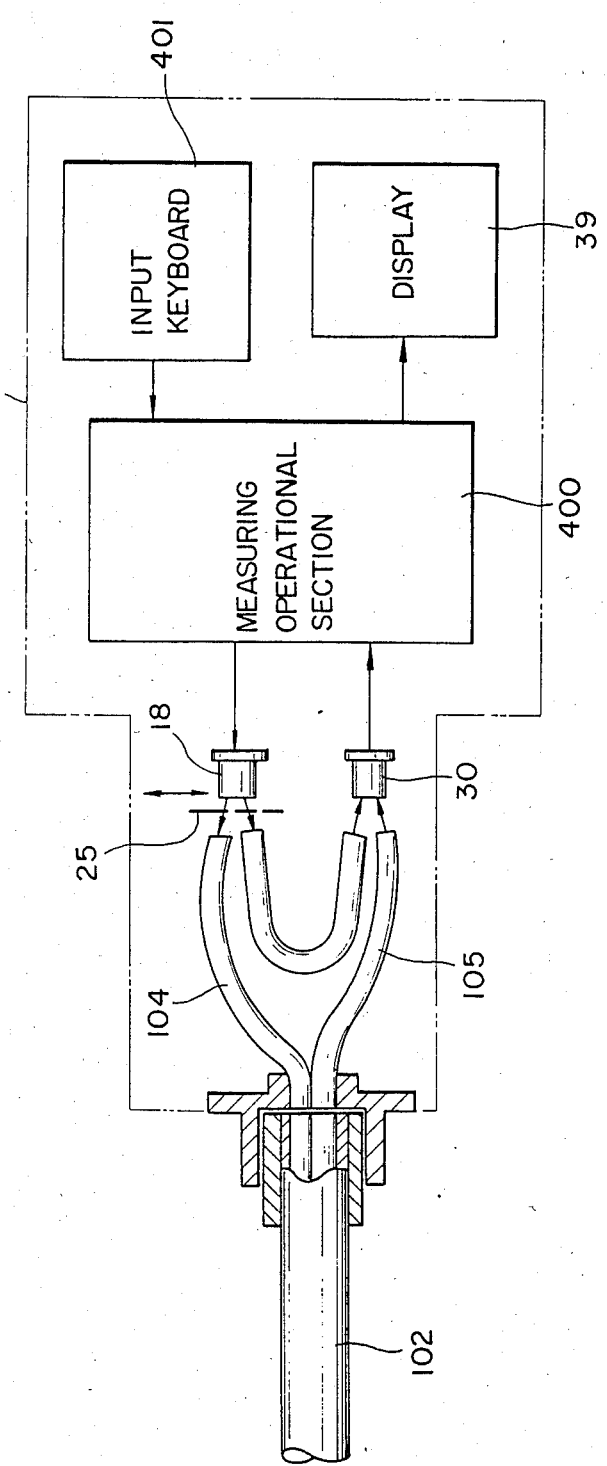
FIG. 15 is a block diagram showing the light wave rangefinder used with the eighth embodiment.

The telescope section 310 comprises an objective lens 311, a dichroic prism 312, a focusing lens 313, an erecting optical device 314, a collimating reticle plate 315 and an eye piece 316 to constitute a reticle plate 315 and an eye piece 316 to constitute a collimation telescope for collimating the alidade. A dichroic surface 312a of the dichroic prism 312 is transparent to visible light, but reflective to infrared light which is the distance measuring light. The distance measuring light 23a from the light emitting element 18 shown in FIG. 15 is, after being thrown out of the optical fiber 104, reflected at a reflecting surface 317a of the prism 317 and at the dichroic surface 312a, and then it is directed through the objective 311 towards a reflector ( not shown ) placed at the target point. The reflected light 23b reflected from the reflector again passes through the objective lens 311 and is reflected at the dichroic surface 312a of the dichroic prism 312. The light 23b is then reflected at the other reflecting surface 317b of the prism 317 and then enters the optical fiber 105. The light is, after travelling through the optical fiber 105, received by the light receiving element 30 as shown in FIG. 15, and thereafter, the distance is obtained from a measuring operational section 400 similar to the aforementioned first embodiment and is displayed on a disply 39. An input keyboard 401 is provided to input various control commands and correction data or to input measured value conversion commands. According to this embodiment, it is possible to provide a light-wave alidade having a collimating telescope which, althrough the inlet and outlet ends of a light conduction pipe 102 and a dichroic prism 312 are incorporated, is of almost the same size as a known telescope for alidade. In addition, the light-wave rangefinder 1 has the same construction as an ordinary light-wave rangefinder, and therefore, it is not necessary to make forcible design for miniaturization and to delete unavoidable function elements. Besides, if the light-wave rangefinder 1 is not made of the exclusive use type as shown in FIG. 15 but shows that the incident side of the optical adapter is constructed as shown in FIG. 3, it can serve also as a general light-wave rangefinder.

In all the above-mentioned embodiments, the photoconduction pipe 102 is constituted by two separate optical fibers, one 104 for transmission and the other 105 for reception. The provision of separate optical fibers is preferable in order to prevent interference between the distance measuring light and reflected light, but is not always essential. In addition, in an application wherein, as in the first to seventh embodiments, the front objective lens system is fixed and not often moved, this photoconduction pipe 102 need not be constituted by optical fiber but may be substituted by a well known mirror and lens system.

What is claimed is:

1. Liquid level measuring apparatus, comprising:
    first light generation means for generating a distance measuring light modulation by a given modulation signal;
    second light generation means for generating a reference light which is modulated by said given modulation signal, said reference light having a wavelength different from the wavelength of said distance measuring light;
    photoconduction means for optically conducting said distance measuring light and said reference light;
    objective optical means including
        objective lens means for projecting at least said distance measuring light onto a liquid surface to be measured and for condensing at least a reflected distance measuring light reflected from the liquid surface, and
        light selection means for leading said distance measuring light exited from said photoconduction means toward the liquid surface and said reflected distance measuring light toward said photoconduction means respectively, and for returning said reference light exited from said photoconduction means toward said photoconduction means;
    light receiving means for receiving both said reflected distance measuring light and said reference light returned through said photoconduction means; and
    distance measuring means for determining a liquid level of the liquid surface based on a time delay between said distance measuring light and said reflected distance measuring light.

2. A liquid level measuring apparatus according to claim 1, wherein said light selection means includes a beam splitter for transmitting both said distance measuring light and said reflected distance measuring light therethrough and for reflecting said reference light thereon in correspondence with the difference of the wavelength between said distance measuring light and said reference light.

3. A liquid level measuring apparatus according to claim 1, wherein said photoconduction means consists of a first optical fiber for photoconducting both said distance measuring light and said reference light which is emitted from said second light emitting means toward said objective optical means, and a second optical fiber for photoconducting both said reflected distance measuring light and said reference light which is returned from said light selection means to said light receiving means.

4. A liquid level measuring apparatus according to claim 3, wherein both said first and second optical fibers are grade index fibers.

5. A liquid level measuring apparatus according to claim 1, wherein said distance measuring light has a middle wavelength of 860 nm and said reference light has a middle wavelength of 820 nm.

6. A liquid level measuring apparatus according to claim 1, wherein said objective lens means comprises an objective optical unit and an auxiliary optical unit.
said objective optical unit including a relay lens for forming an image of said distance-measuring light at a focal point thereof,
said auxiliary optical unit including an objective lens for projecting said distance measuring light from the focal point toward the liquid surface, and
said auxiliary optical unit being connected to said objective optical unit by means of a suspension support mechanism such that said auxiliary optical unit can be rotated with respect to said objective optical unit about the focal point as a center.

7. A liquid level measuring apparatus according to claim 6, wherein said suspension support mechanism is a gimbal mechanism.

8. A liquid distance measuring apparatus, comprising:
first light generation means for generating a distance measuring light modulated by given modulation signal;
second light generation means for generating a reference light which is modulated by said given modulation signal, the wavelength of said reference light being different from the wavelength of said distance measuring light;
photoconduction means for optically conducting said distance measuring light and said reference light wave;
objective optical means including objective lens means for projecting at least said distance measuring light toward a target to be measured and for condensing at least a reflected distance measuring light reflected from the target, and light selection means for leading said distance measuring light exited from said photoconduction means toward the target and said reflected distance measuring light toward said photoconduction means respectively and for returning said reference light exited from said photoconduction means toward said photoconduction means;
light receiving means for receiving both said reflected distance measuring light and said reference light which are returned through said photoconduction means; and
distance measuring means for determining a distance between the target and the apparatus based on a time delay between said distance measuring light and said reflected distance measuring light.

9. A distance-measuring apparatus according to claim 8, wherein said light selection means includes a beam splitter for transmitting both said distance measuring light and said reflected distance measuring light therethrough and for reflecting said reference light thereon according to the difference of the wavelength between said distance measuring light and said reference light.

10. A distance-measuring apparatus according to claim 8, wherein said photoconduction means consists of a first optical fiber for photoconduction of both said distance measuring light and said reference light which is emitted from said second light emitting means toward said objective optical means, and a second optical fiber for photoconducting both said reflected distance measuring light and said reference light which is returned from said light selection means to said light receiving means.

11. A distance-measuring apparatus according to claim 10, wherein both said first and second optical fibers are grade index fibers.

12. A distance-measuring apparatus according to claim 8, wherein said distance measuring light has a middle wavelength of 860 nm and said reference light has a middle wavelength of 820 nm.

13. A distance measuring apparatus according to claim 8, wherein said objective lens means comprises an objective optical unit and an auxiliary optical unit,
said objective optical unit including a relay lens for forming an image of said distance-measuring light at a focal point thereof,
said auxiliary optical unit including an objective lens for projecting said distance measuring light from the focal point toward the target,
said auxiliary optical unit being connected to said objective optical unit by means of a rotatable support mechanism such that said auxiliary optical unit can be rotated with respect to said objective optical unit about the focal point as a center.

14. A distance measuring apparatus according to claim 13, wherein said rotatable support mechanism is gimbal mechanism.

15. For use with a light rangefinder having means for emitting a distance measuring light modulated by predetermined modulation frequency, means for receiving a reflected light from a target to which said distance measuring light is directed, first objective optical means for projecting said distance measuring light toward the target and for condensing said reflected light, and means for a time delay between said distance measuring light and said reflected light to determine the distance from the rangefinder to the target, an optical adapter comprising:
optical relay means being substantially identical in structure with said first objective optical means;
a first optical fiber connected at one end to said optical relay means for photoconducting said distance measuring light;
a second optical fiber connected at one end to said optical relay means for photoconducting said reflected light; and second objective optical means connected to the other ends of said first and second optical fibers for projecting said distance measuring light transmitted through said first optical fiber toward the target and for directing said reflected light to said second optical fiber.

16. An optical adapter according to claim 15, wherein said second objective optical means is substantially identical in structure with said optical relay means.

17. An optical adapter according to claim 15, wherein said objective optical means is a telescope of a light alidade.

18. An optical adapter according to claim 15, wherein said first and second optical fibers are graded index optical fibers.

19. An optical adapter according to claim 15, wherein said first objective optical means of said light rangefinder has a first single objective lens and a first reflecting means, said first single objective lens has two focal points thereof one of which is positioned at said light emitting means and the other of which is positioned at said light receiving means, said first reflecting means has two reflecting surfaces, one of which reflects said distance measuring light emitted from said light emitting means toward said first objective lens and the other of which reflects and directs said reflected light condensed by said first single objective lens to said light receiving means, and said optical relay means has a second single objective lens and a second reflecting means, said second single objective lens being disposable against said first single objective lens when said first objective optical means and said optical relay means are optically combined with each other and having two focal points thereof, one of said focal points being positioned at said one end of said first optical fiber and the other of said focal points being positioed at said one end of said second optical fiber, and said second reflecting means having two reflecting surfaces, one of said surfaces reflecting and directing said distance measuring light condensed by second single objective lens to said one end of said first optical fiber and the other of said surfaces reflecting said reflected light exited from said one end of said second optical fiber toward said second objective lens.

20. An optical adapter according to claim 15, wherein said second objective optical means comprises an objective optical unit and an auxiliary optical unit, said objective optical unit including a relay lens for forming an image of said distance-measuring light at a focal point thereof, said auxiliary optical unit including an objective lens for projecting said distance measuring light from the focal point toward the target point, and said auxiliary optical unit being connected to said objective optical unit by means of a rotatable support mechanism such that said auxiliary optical unit can be rotated with respect to said objective optical unit about the focal point as a center.

21. An optical adapter according to claim 20, wherein said rotatable support mechanism is a gimbal mechanism.

22. In a distance-measuring apparatus comprising light generation means for generating a light modulated by a given modulation frequency, objective optical means for projecting said light wave toward a target to be measured and for condensing a reflected light reflected from the target, light receiving means for receiving said reflected light, and determination means for determining the distance to the trget based on a time delay between said light said reflected light, said objective optical means comprising:

an objective optical unit and an auxiliary optical unit;

said objective optical unit containing a relay lens for forming an image of said light at a focal point thereof;

said auxiliary optical unit containing an objective lens for projecting said light from the focal point toward the target and for condensing said reflected light at the focal point once again; and said auxiliary optical unit being connected to said objective optical unit by means of a rotatable support mechanism such that said auxiliary optical unit can be rotated with respect to said objective optical unit about the focal point as a center.

23. An objective optical means according to claim 22, wherein said rotatable support mechanism is a gimbal mechanism.

24. A liquid level heigh-measuring apparatus, comprising:

a light wave generating means for generating a distance-measuring light wave modulated at a predetermined modulation frequency;

an objective optical means for irradiating the distance-measuring light wave upon the surface of a liquid level to be distance-measured and collecting reflected distance-measuring light wave reflected from the surface of the liquid level to be distance measured;

a light-receiving eans for receiving the reflected distance-measuring light wave from said objective optical means;

a light wave transmission piping member for optically connecting said light wave generating means and said light-receiving means with said objective optical means;

means to measure the height of the liquid level to be distance-measured on the basis of the time delay between the distance-measuring light waves and the reflected distance-measuring light waves connected to said light-receiving means;

reference means for measuring the length of said light wave transmission piping member;

said reference means being connected to receive light waves from said light wave generating means and transmitting said light waves to said light receiving means, and including a second light wave transmission piping member having a separate closed path from where it receives light waves from said light wave generating means to where it delivers said light waves to said light receiving means having a length substantially the length of said first-mentioned light wave transmission piping member.

25. The liquid level height-measuring apparatus of claim 24, and further including a prism having at least two reflecting surfaces and positioned to receive light waves from said light wave-generating means and to reflect said light waves to an end of at least one of said light wave transmission piping members, and to receive light waves from said at least one of said light wave transmission piping members and reflect said last-mentioned light waves to said light-receiving means.

26. A liquid level height-measuring apparatus, comprising:
   a light wave generating means for generating a distance-measuring light wave modulated at a predetermined modulation frequency;
   an objective optical means for irradiating the distance-measuring light wave upon the surface of a liquid level to be distance-measured and collecting reflected distance-measuring light wave reflected from the surface of the liquid level to be distance measured;
   a light-receiving means for receiving the reflected distance-measuring light wave from said objective optical means;
   a light wave transmission piping member for optically connecting said light wave generating means and said light-receiving means with said objective optical means;
   means to measure the height of the liquid level to be distance-measured on the basis of the time delay between the distance-measuring light waves and the reflected distance-measuring light waves connected to said light-receiving means;
   reference means for measuring the length of said light wave transmission piping member;
   said reference means being connected to receive light waves from said light wave generating means and transmitting said light wave to said light receiving means, and including
   a prism having at least two external reflecting surfaces included as part of said objective optical means located at the far end of said light wave transmission piping member from said light wave generating means and said light-receiving means and positioned to receive light waves from said piping member and reflecting said light waves generally toward the liquid surface and receiving light waves generally from the liquid surface and reflecting them to said piping member.

27. The liquid level height-measuring apparatus of claim 26, and further including
   a prism with internally reflecting surfaces for receiving light waves from said externally-reflecting prism and for reflecting said light waves back to said externally reflecting prism.

28. The liquid level height-measuring apparatus of claim 27, and further including
   said prism with internally reflecting surfaces having a trapezoidal shape.

* * * * *

UNITED STATES PATENT AND TRADEMARK OFFICE
CERTIFICATE OF CORRECTION

PATENT NO. : 4,692,023
DATED : September 8, 1987
INVENTOR(S) : OHTOMO et al

It is certified that error appears in the above—identified patent and that said Letters Patent is hereby corrected as shown below:

On the title page assignee should read

-- [73] Assignee: Tokyo Kogaku Kikai Kabushiki Kaisha, Tokyo, Japan --

Signed and Sealed this

Twelfth Day of April, 1988

Attest:

DONALD J. QUIGG

Attesting Officer

Commissioner of Patents and Trademarks